United States Patent Office 3,291,782
Patented Dec. 13, 1966

1

3,291,782
OIL-SOLUBLE COPOLYMERS OF BIALLYL AND ALPHA-OLEFINS
William S. Anderson, Oakland, and John Boor, Jr., El Cerrito, Calif., assignors to Shell Oil Company, New York, N.Y., a corporation of Delaware
No Drawing. Filed May 10, 1965, Ser. No. 454,690
4 Claims. (Cl. 260—80.5)

This patent application is a continuation-in-part of co-pending patent application, Serial No. 93,012 filed March 3, 1961 which has matured as U.S. Patent 3,223,638 on December 14, 1965.

The present invenion relates to a new and novel class of oil-soluble non-crystalline cyclohydrocarbon copolymers which are particularly useful as lubricants and as additives for lubricating oil.

It is known that polymers of alpha,omega-diolefins prepared in the presence of conventional Ziegler type catalysts such as aluminum trialkyltitanium tetrahalide catalysts, e.g., aluminum triethyl or aluminum triisobutyl and titanium tetrachloride result in low molecular weight polymers having cross linkages, rendering them essentially oil-insoluble and mechanically and thermally unstable.

In the field of lubrication, certain olefinic polymers such as polyisobutylene, polystyrenes, copolymers or isobutylene and naphthalene, copolymers of butenes and long chain alpha-olefins such as octene-1 or octadecene-1, are known to be useful as pour point depressants and viscosity index improvers for mineral oils but are limited in their use because they are mechanically unstable, particularly when used in lubricants subject to high shear rates. This apparent inherent instability of this class of polymers is the cause of viscosity loss and other undesirable side reactions which occur in oils containing such additives. This is particularly aggravating when the base oil contains other additives such as detergents, extreme pressure additives such as organic metal salts, nitrogen-containing detergent polymers, organic phosphorous-containing compounds and the like, which tend to interact with the unstable components of the olefinic polymers mentioned above and thus cause sludging, wear and corrosion. Also, certain olefinic polymers useful as plastics or fibers such as polyethylene are insufficiently thermally stable, thereby limiting their use.

It has now been discovered that excellent mechanically and thermally stable, high molecular weight, non-crystalline cyclohydrocarbon copolymers can be prepared polymerizing alpha,omega-diolefins with alpha-monoolefins having from 3 to 30 and preferably 3 to 18 or more carbon atoms in the presence of a novel low pressure catalyst. The novel catalyst is produced by (1) reacting hydrocarbon solutions of aluminum triethyl and titanium tetrachloride in a mole ratio ranging from about .1:1 to less than .6:1 at elevated temperatures until the aluminum triethyl is completely oxidized and (2) thereafter reacting the total product of (1) with a hydrocarbon solution of aluminum diethyl chloride in an amount to give a total aluminum to titanium mole ratio of at least 1:1.

The selection and amount of catalyst components, as

2 well as the order of reaction is critical in the preparation of novel catalyst for cyclohydrocarbon polymers of this invention.

In the first step of the catalyst preparation the reaction between the titanium tetrachloride and the aluminum triethyl effects a reduction of at least part of the titanium tetrachloride to titanium trichloride. Stoichiometrically, complete reduction is accomplished by the reaction of 0.33 mole of aluminum triethyl with 1 mole of the titanium tetrachloride. For the purpose of this invention, it is found that there must not be .4 or more moles of the aluminum triethyl per mole of the titanium tetrachloride. Hence, the reaction in the first step between the aluminum triethyl and the titanium tetrachloride must be in an aluminum triethyl to titanium tetrachloride mole ratio of less than .4 to 1. The minimum ratio is .1 to 1. In the more preferred procedures, the mole ratio is between about .33:1 and 0.4:1, an effective mole ratio of about 0.33:1 being especially preferred, as these ratios ultimately produce the best combination of polymerization rates, conversions and percentages of linear polymer. Since impurities may use up some of the added aluminum triethyl, it may sometimes be desirable to add a slight excess of aluminum triethyl to assure that the effective ratio is as desired. For example, when an effective ratio of 0.33:1 is desired, this can be assured by adding a slight excess, such as 0.34:1, 0.35:1 or 0.36:1.

The reaction between the titanium tetrachloride and aluminum triethyl is carried out at elevated temperatures for a period of time sufficient to oxidize at least all of the aluminum triethyl. The time is influenced by the temperature; heating for 20 minutes at 80° C. is suggested as a minimum; heating for 2 hours at 80° C. is suitable. Polycyclohydrocarbon polymers of a substantially higher ring content are obtained if alpha,omega-diolefins or mixtures of such alpha,omega-diolefins and alpha-monoolefins are reacted in the presence of the catalysts of this invention particularly if the reaction is carried out for period of time substantially in excess of the minimum required to oxidize the aluminum triethyl. Heating for as much as 24 hours or more at 80° C., 2 hours at 100° C. or 20 minutes at 170° C. results in a purple catalyst and an improved ring content and less crosslinking of products of the present invention.

The initial reaction between the titanium tetrachloride and the aluminum triethyl is carried out with these reactants in solution in hydrocarbon solvents such as heptane, octane, pentane, isopentane and the like. Suitably, solutions of titanium tetrachloride and aluminum triethyl are prepared, and measured amounts of each solution are mixed together to give the desired mole ratios which, as previously indicated, range from an aluminum to a titanium mole ratio ranging from less than .4:1 to about .1:1. The reaction between titanium tetrachloride and aluminum triethyl at elevated temperatures terminates the first step of the catalyst preparation and at this point the reaction mixture comprises a solid suspension in the hydrocarbon medium and the total mixture has a brown or purple color, depending mainly on the time and temperature utilized for the reaction.

The hydrocarbon solutions of the catalyst components may be of any concentration. Solutions prepared by mixing 100 millimoles per liter of solvent are found to be convenient for subsequent metering. A surprising finding is that advantages in the ultimate polymer are obtained as the concentration of the components in the solvent is increased, as will be shown more fully hereinafter.

The second step of the catalyst preparation requires adding to the total mixture prepared above aluminum diethyl chloride which is suitably obtained in solution in a hydrocarbon solvent. The amount of the aluminum diethyl chloride that is added may vary a great deal with the provision that the minimum be at least sufficient to provide a total aluminum to titanium mole ratio of 1.0. Thus, the minimum depends entirely on the mole ratio of the aluminum triethyl and titanium tetrachloride selected in the first step. Any amount greater than the minimum is suitable but large excesses, say in the order of 10 moles, are uneconomical and wasteful. In the preferred procedure, aluminum diethyl chloride is added in an amount to give a total aluminum to titanium mole ratio ranging from about 2:1 to about 6:1.

In those cases in which the Al:Ti ratio was less than about 0.33:1 and $TiCl_4$ is still present, the total mixture is agitated briefly after the aluminum diethyl chloride is added, to reduce the titanium tetrachloride completely. It is not necessary to cool or heat the mixture to which the aluminum diethyl chloride is added, and the catalyst will be stable for several months or more. Generally, it is preferred to heat the Al:Ti/$AlEt_2Cl$ mixture to 80° C. for about 1 hour. The total mixture consists of a suspension of fine, brown or purple particles in the hydrocarbon solvent. The suspension, if permitted to stand for a while, will begin to settle. Accordingly, before being used, it should be agitated in order to produce a homogeneous product which is the active catalyst of this invention.

In those cases where the Al:Ti ratio in the first step was at least about 0.33:1 and where no $TiCl_4$ remains in the product from the first step, the aluminum diethyl chloride required to bring the Al:Ti ratio to at least 1:1 can be added directly to the polymerization reaction mixture.

Non-crystalline oil-soluble cyclohydrocarbon polymers are prepared in the presence of the catalysts of this invention by copolymerizing alpha,omega-diolefins with alpha-monoolefins of at least 3 and up to 30 or more carbon atoms preferably 3 to 18 carbon atoms such as copolymers of (A) 1,5-hexadiene (biallyl), 2-methyl-1,5-hexadiene, 3-methyl-1,5-hexadiene, 1,6-heptadiene, 2-5-dimethyl-1,5-hexadiene, alpha,omega-octadiene, and the like with (B) alpha-monoolefins of three or more carbon atoms, preferably from 3 to 18 carbon atoms, e.g., propylene, butene-1, pentene-1, octene-1, 3-methyl-pentene-1, 3-ethyl-pentene-1, 4-methyl-pentene-1,3-methyl-heptene-1,vinyl-cyclohexene, 1-octadecene, 1-dodecene, styrene and the like. Steric factors of the monomers may, of course, affect the reaction. Mixtures of alpha-omega-diolefin monomers may also be polymerized or such mixtures may be polymerized with alpha-monoolefins.

The cyclohydrocarbon polymers of the present invention range in molecular weight of from 5,000 to 2½ million of which the non-crystalline oil-soluble cyclohydrocarbon copolymers have a molecular weight of from 50,000 to 1,000,000.

The copolymerization of alpha,omega-diolefins with alpha-monoolefins with the novel catalysts are conducted in agitated pressure vessels under conditions that exclude air and other atmospheric impurities, particularly moisture. In one suitable method, the vessel, after purging with an inert gas, is charged with the catalyst suspension prepared as described above, having all $TiCl_4$ reduced to $TiCl_3$. An additional quantity of hydrocarbon solvent is usually added. The amount of aluminum diethyl chloride required to bring the Al:Ti ratio above 1:1 may also be added at this time, as such or in hydrocarbon solution. Thereafter the monomer to be polymerized is charged to the vessel and the polymerization begins. At first, the temperature within the reactor will rise due to an exotherm so that cooling may be supplied initially in order to maintain any desired polymerization temperature which, on all cases should be less than about 100° C. and more preferably from about 0 to 50° C. The pressures are not critical and may be autogenic pressures which will vary depending upon the quantity of the solvent in the reactor, the nature of the monomer to be polymerized, the temperature and the like. In batch operations, the polymerization may be terminated when monomer is no longer absorbed as indicated by a suitable pressure gauge. In continuous operations the polymerization mixture passes through a continuous reactor of any suitable design and the polymerizations in such cases are adjusted by the residence time which may be determined by a few preliminary runs at the particular concentrations, temperatures, pressures, and the like that are adopted. After the polymerization is complete the polymer is sometimes recovered as a slurry of the solid polymer in hydrocarbon liquid and to separate the polymer from the solvent a simple filtration is adequate. Thereafter, the polymer may be washed a few times in order to separate catalyst residues. Further treatment may be undertaken as will be understood from the prior art.

The following examples are illustrative of the method of preparing the catalysts used in the preparation of cyclohydrocarbon polymers of the present invention.

EXAMPLE 1

A catalyst was prepared by mixing under a nitrogen atmosphere a hydrocarbon solution of 20 millimoles of $TiCl_4$ (200 ml.) with 7.2 millimoles of $AlEt_3$ (72 ml.) and reacting two hours at 80° C. This mixture was then centrifuged, the supernatant liquid decanted, and 20 millimoles (200 ml.) of $AlEt_2Cl$ added and the mixture was heated another hour at 80° C. This catalyst was then added to 4 liters of purified isooctane containing 60 millimoles of $AlEt_2Cl$ making the overall Al:Ti ratio about 4.4:1.

Other examples of catalysts used in preparation of cyclopolymers of the present invention were prepared as follows:

| Examples | $TiCl_4$, Mmole | $AlEt_3$, Mmole | Catalyst Preparation Reaction Time at ° C. | $AlEt_2Cl$, Mmoles |
|---|---|---|---|---|
| 2 | 2 | 0.66 | 2 hrs. at 80° C. | 7.2 |
| 3 | 1.2 | 0.40 | ½ hr. at 60° C. | 3.5 |
| 4 | 4 | 1.33 | 2 hrs. at 80° C. | 14.4 |
| 5 | 20 | 0.6 | 2 hrs. at 80° C. | 20 |

In a continuous mode of operating the polymerization process, the hydrocarbon solution of the reaction product of $TiCl_4$ with from 0.33 to less than 0.4 mole of aluminum triethyl, prepared as described, may be separately passed into the reaction mixture, continuously or intermittently, while sufficient aluminum diethyl chloride to bring the Al:Ti ratio above 1 is also added separately into the reaction mixture. The active catalyst is then formed in the reaction mixture by interreaction between the $TiCl_4$-aluminum triethyl reaction product and aluminum diethyl chloride.

The recovered polymer will be found, generally, to have a rather high molecular weight as indicated by intrinsic viscosity determinations in decalin at 150° C. Polymer of controlled molecular weight may be obtained by conducting the polymerization in the presence of various additives which limit the molecular weight of polymer produced in the reaction. The more effective additives for this purpose include hydrogen and zinc diethyl.

The following examples are illustrative of cyclohydrocarbon polymers of the present invention prepared in the presence of the purple catalyst as described above.

EXAMPLE I

A 500-ml. glass bottle was flushed with nitrogen and charged with 240 ml. dry isooctane, 15 ml. catalyst of Example 1, 25 ml. dry 1-hexene and 20 ml. of dry biallyl (1,5-hexadiene). The bottle was tumbled end-over-end at 25° C. for 25 hours; polymerization was stopped with IPA. During polymerization, the catalyst breaks down into very small particles which gives the mixture the appearance of a solution. The re-precipitated polymer weighed 9.4 g., intrinsic viscosity in 50/50 100 neutral/ 250 neutral oils was 2.5 dl./g. (100° F., 210° F.). The copolymer had the general formula

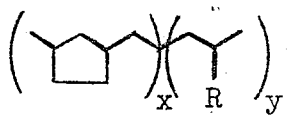

[See Table I]

where $x$ and $y$ are integers totally more than 4 and generally varying from 20 to 14,000 and R is an alkyl radical.

EXAMPLE II (A) Twenty-five ml. of dry 1,5-hexadiene (biallyl) and 25 ml. of isooctane were charged to a 100 ml. stirred reactor. While maintaining the mixture at 68-69° C., ethylene was passed in for five minutes. Ten ml. of purple catalyst of Example 1 was then added and the mixture was stirred at 66-89° for 30 minutes, ethylene flow being continued through the reaction period. There was obtained 6.6 g. of fibrous polymer of M.P. 80° C. Ethylene content of polymer 13% m. and the copolymer was soluble in mineral oil at temperatures above 50° C.

(B) Thirty ml. of biallyl and 40 ml. of isooctane was saturated with ethylene at a solution temperature of 64° C. Ten ml. of catalyst of Example 1 was injected and the mixture was allowed to stir at 60-70° C. for one hour. Polymer weight 10.9 g. Melting point 45° C. Ethylene content of polymer 32% m., and the copolymer was oil soluble at temperatures above 50° C.

Following the procedure of the above Examples I-II, the following additional polymers and copolymers of the present invention were prepared.

methylene bisphenols such as 4,4'-methylene bis(2,6-ditert. butylphenol) or anti-scuffing agents including organic phosphites, phosphates, phosphonates and their thio-derivatives, such as $C_{3-18}$ alkyl phosphites, or phosphonates, e.g., di- and tributyl, octyl, lauryl, stearyl, cyclohexyl, benzyl, cresyl, phenyl, phosphites or phosphonates or which the full esters of pentavalent phosphorus acids such as triphenyl, tricresyl, trilauryl and tristearyl orthophosphates are preferred.

The polymeric additives of this invention improve various mineral oil products by the incorporation of a minor amount (0.01% to 5%, preferably 0.1% to 3% by weight) of the additive. Thus, they may be used to improve transformer oils, turbine oil, hydraulic fluids, mineral lubricating oils, industrial oils and the like. Suitably, such lubricating oils range from SAE 5W viscosity grade to SAE 140 grade and are derived from paraffinic, naphthenic or asphaltic base crudes. Representative oils are refined high viscosity index mineral oils having a viscosity at 100° F. of 100 to 250 SUS. A typical mineral lubricating oil (X) of this type had the following properties:

| | |
|---|---|
| Br., ° API, 60/60° F. | 32 |
| Flash, ° F. | 370 |
| Viscosity index (Dean and Davis) | 93 |
| Viscosity, SUS at 100° F. | 103 |

The following non-ash compositions are representative of this aspect of the invention.

Composition A:                                        Percent wt.
    Example I copolymer _____ 2
    Mineral lubricating oil (X) _____ Bal.
Composition B:
    Example IV copolymer _____ 2
    Mineral lubricating oil (X) _____ Bal.
Composition C:
    Example V copolymer _____ 2
    Mineral lubricating oil (X) _____ Bal.
Composition D:
    Example V copolymer _____ 3
    4,4'-methylene bis(2,6-ditert.butylphenol) ____ 1
    Mineral lubricating oil (aviation oil 1100 grade) Bal.
Composition E:
    Example V copolymer _____ 5
    4,4'-methylene bis(2,6-ditert.butylphenol) ____ 0.5
    Tricresyl phosphate _____ 0.8
    Mineral lubricating oil (X) _____ Bal.

Table 1

| Ex. | a,ω-Diolefin | α-Monoolefin | Catalyst | Temp., °C. | Solvent | Formula ª | Type | M.W. |
|---|---|---|---|---|---|---|---|---|
| III | Biallyl (1)/ 1.6-heptadiene (1). | 1-pentene | Ex. 1 | 80 | Heptane | | Noncrystalline, oil-soluble. | 500,000 |
| IV | Biallyl | Ethylene (1)/ 1-hexene (1). | Ex. 1 | 80 | Isooctane | | do | 500,000 |
| V | do | 1-octadecene | Ex. 2 | 80 | Heptane | | do | 1,000,000 |

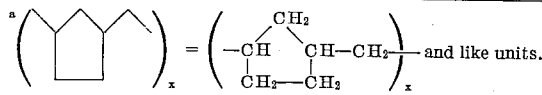

When desired, additional improvements with respect to oxidation stability and scuffing inhibition can be imparted to the oil compositions containing the copolymers of this invention by incorporating small amounts (0.01%-2%, preferably 0.1%-1%) of phenolic antioxidants such as alkylphenols, e.g., 2,6-ditert.butyl-4-methylphenol or p,p'-

In order to show the criticalness in the reaction conditions of the present invention in order to produce the copolymers of the present invention, the following polymers were prepared and subjected to infrared absorption analysis and solubility in hot decalin and xylene and the results are shown in Table II.

Table II

| Polymer | Infrared Absorption Analysis | Solubility in Hot Hydrocarbon | |
|---|---|---|---|
| | | Decalin | Xylene |
| Copolymer of biallyl and 1-hexene (Ex. I) | No unsaturation, cyclic structure | Soluble | Soluble. |
| Copolymer of decene-1 and butadiene [a] | Unsaturated, linear structure | Insoluble | Insoluble. |
| Copolymer of propylene and piperylene [b] | do | do | Do. |
| Butadiene Polymer [c] | do | do | Do. |
| Copolymer of Ex. I (present invention) made in the presence of benzoyl peroxide. | No reaction | | |

[a] Made by method described in U.S. Patent 2,551,641.
[b] Made by method described in U.S. Patent 2,901,432.
[c] Made by method described in U.S. Patent 3,058,963.

The mechanical stability of compositions of the present invention as well as other compositions noted below was determined by subjecting the test compositions to Ultrasonic degradation in a 400 watt Acoustica Associates DR–400A oscillator and AT–2000 water-cooled magnetostriction transducer. The transducer was fitted to the bottom of a one-quart stainless steel tank and oil solutions were placed directly in contact with the steel transducer surface. The oscillator output consists of a 25±1 kc. signal pulsed at 120 pulses per second. Peak power is 1600 watts; average power 400 watts. Output current for all experiments was arbitrarily adjusted to 1.8 amperes RF (near the point of resonance of the loaded bath+transducer) by varying the inductance in the oscillator tank circuit. The power actually transmitted to the oil solution is therefore 120 watts average and 480 watts on peak. Area of the transducer radiating surface was 387 cm.$^2$; the calculated average intensity was 0.31 watt/cm.$^2$.

Composition A–E were 5 to 10 times more resistant to degradation when tested under the above condition than Composition X (mineral oil (X)+2% copolymer of ethylene and octene-1 (50/50)); Composition Y (mineral oil (X)+2% polyhexene-1); Composition Z (mineral oil (X)+2% polylauryl methacrylate).

Thermal stability of the cyclohydrocarbon polymers was determined by measuring weight loss continuously while polymer was heated at 2.5°/minute in a nitrogen atmosphere. The thermogravimetric curves obtained in this way showed that the temperatures required to decompose the polymers of this invention, namely Examples I to V, are 100–200° higher than the decomposition points of polyisobutylene and poly(alkyl methacrylate) oil additives.

We claim as our invention:

1. An oil-soluble non-crystalline cyclohydrocarbon copolymer having a molecular weight of from 500,000 to 1,000,000 obtained by reacting a mixture of biallyl and an alpha-monoolefin of from 2 to 18 carbon atoms in a liquid hydrocarbon medium at a temperature below 100° C. in the presence of a catalyst obtained by reacting hydrocarbon solutions of aluminum triethyl and titanium tetrachloride in a mole ratio ranging from about 0.1:1 to less than 0.4:1 at elevated temperatures for a time sufficient to completely oxidize the aluminum triethyl and thereafter reacting the resulting mixture with a hydrocarbon solution of aluminum diethyl chloride in an amount to give a catalyst-containing mixture having a total aluminum-to-titanium mole ratio of at least 1:1.

2. An oil-soluble non-crystalline cyclohydrocarbon copolymer having a molecular weight of from 500,000 to 1,000,000 obtained by reacting a mixture of biallyl, 1-hexene and ethylene in a liquid hydrocarbon medium at a temperature below 100° C. in the presence of a catalyst obtained by reacting hydrocarbon solutions of aluminum triethyl and titanium tetrachloride in a mole ratio ranging from about 0.1:1 to less than 0.4:1 at elevated temperatures for a time sufficient to completely oxidize the aluminum triethyl and thereafter reacting the resulting mixture with a hydrocarbon solution of aluminum diethyl chloride in an amount to give a catalyst-containing mixture having a total aluminum-to-titanium mole ratio of at least 1:1.

3. An oil-soluble non-crystalline cyclohydrocarbon copolymer having a molecular weight of from 500,000 to 1,000,000 obtained by reacting a mixture of biallyl and 1-hexene in a liquid hydrocarbon medium at a temperature below 100° C. in the presence of a catalyst obtained by reacting hydrocarbon solutions of aluminum triethyl and titanium tetrachloride in a mole ratio ranging from about 0.1:1 to less than 0.4:1 at elevated temperatures for a time sufficient to completely oxidize the aluminum triethyl and thereafter reacting the resulting mixture with a hydrocarbon solution of aluminum diethyl chloride in an amount to give a catalyst-containing mixture having a total aluminum to titanium mole ratio of at least 1:1.

4. An oil-soluble non-crystalline cyclohydrocarbon copolymer having a molecular weight of from 500,000 to 1,000,000 obtained by reacting a mixture of biallyl, 1,6-heptadiene and pentene-1 in a liquid hydrocarbon medium at a temperature below 100° C. in the presence of a catalyst obtained by reacting hydrocarbon solutions of aluminum triethyl and titanium tetrachloride in a mole ratio ranging from about 0.1:1 to less than 0.4:1 at elevated temperatures for a time sufficient to completely oxidize the aluminum triethyl and thereafter reacting the resulting mixture with a hydrocarbon solution of aluminum diethyl chloride in an amount to give a catalyst-containing mixture having a total aluminum-to-titanium mole ratio of at least 1:1.

References Cited by the Examiner

UNITED STATES PATENTS 2,933,480  4/1960  Gresham et al. _____ 260—80.5
2,943,063  6/1960  Eby et al. _____ 260—94.9

JOSEPH L. SCHOFER, *Primary Examiner.*

W. HOOVER, *Assistant Examiner.*